UNITED STATES PATENT OFFICE.

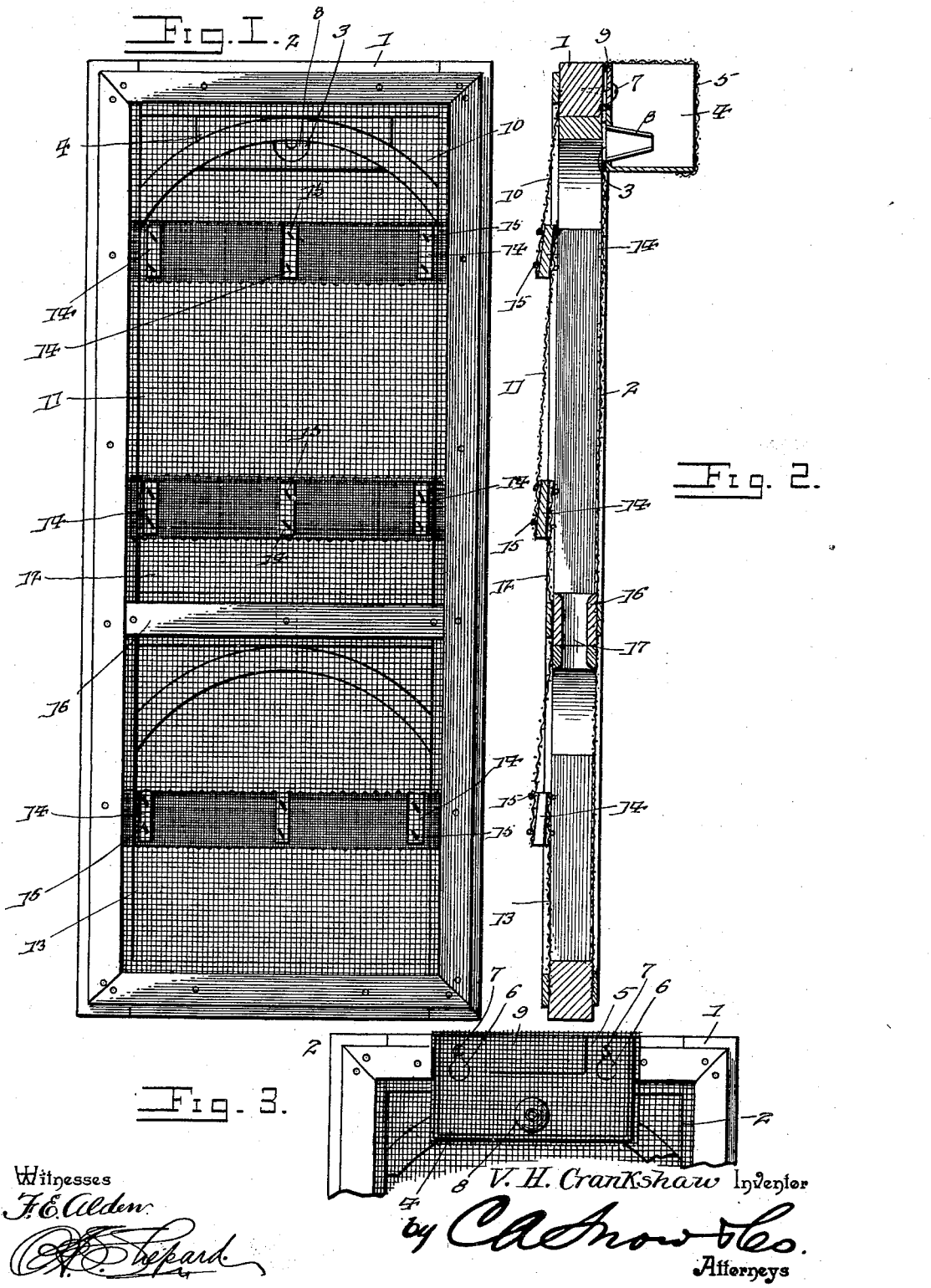

VERNER HENRY CRANKSHAW, OF CARO, MICHIGAN.

FLY-TRAP.

SPECIFICATION forming part of Letters Patent No. 671,510, dated April 9, 1901.

Application filed July 9, 1900. Serial No. 23,034. (No model.)

*To all whom it may concern:*

Be it known that I, VERNER HENRY CRANKSHAW, a citizen of the United States, residing at Caro, in the county of Tuscola and State of Michigan, have invented a new and useful Fly-Trap, of which the following is a specification.

This invention relates to insect-screens, and has for its object to provide an improved device of this character for doors and windows and which is arranged to exclude insects upon the outer side of the screen and to permit of the insects escaping outwardly from the inner side of the screen. It is furthermore designed to permit of the insects traveling throughout the length of the screen, so that they may pass into a trap or receptacle, the latter being removable, so that the insects may be collected and killed.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is an elevation of the inner side of a screen-door constructed in accordance with the present invention. Fig. 2 is a longitudinal sectional view thereof, taken upon the line 2 2 of Fig. 1. Fig. 3 is a detail elevation of the top of the outer side of the screen, showing the removable trap.

Corresponding parts are designated by like characters of reference in all of the figures of the drawings.

Referring to the drawings, 1 designates the frame of the screen, which is provided upon its outer side with a continuous wire screen 2, that is secured to the frame in any preferred manner and provided near its upper end with an exit-opening 3, through which the flies and other insects are designed to pass from the inner side of the frame or door to the outer side thereof.

In order that the insects may be prevented from passing inwardly through the exit-opening, the latter is provided with a closure in the form of a trap 4, which has its bottom, inner side, and opposite ends made of metal and its top and outer side formed of foraminous material 5, so as to admit light into the interior of the trap. The back or inner side of the trap is provided with a pair of keyhole-slots 6, which are designed to receive suitable headed studs or fastenings 7, which project outwardly from the top cross-bar of the frame of the screen, so that the trap is removably secured to the screen. The back of the trap is also provided with an opening corresponding with the exit-opening in the screen, and extending inwardly into the interior of the trap is a conical hood 8, the larger end of which surrounds the opening, the smaller end of the cone being cut off, so as to permit of the insects passing through the corresponding openings and the hood and finally into the trap. Immediately above the truncated conical hood a door 9 is formed in the back of the trap, said door opening outwardly, so as to facilitate the removal of the insects. It will be observed that the back of the trap fits flush against the end of the frame and the screen, so as to normally hold the door closed without the aid of any additional fastening.

The inner side of the screen is formed by a plurality of screen-sections 10, 11, 12, and 13, the adjacent transverse edges of which are overlapped and separated by intermediate spacing-blocks 14, which are located between the overlapped portions of the respective sections and secured thereto by means of suitable fastenings 15. By this arrangement a plurality of transverse openings are formed in the inner side of the screen, so that the insects may pass into the space between the front and rear sides of the screen and travel upward to the trap.

In order that the insects may readily pass from the bottom of the screen to the top thereof, the intermediate cross-bar 16 of the frame is provided with one or more vertical openings 17, so that the insects may conveniently pass through the cross-bar.

From the foregoing description it will be seen that the present device comprises a frame having front and rear screen sides, which are separated by the thickness of the frame, the rear or inner side having openings through which the insects are designed to pass into the space between the screen sides and thence through an exit-opening in the outer screen side and into a trap, which is removable for conveniently killing the insects, the trap also serving to prevent the inward passage of insects upon the outer side of the screen.

What is claimed is—

A device of the class described, comprising a frame, opposite sheets of screen material secured to the opposite sides of the frame, one of the sheets having one or more inlet-openings formed therein, and the other sheet having an outlet-opening located adjacent to the upper end of the frame, fastening means carried by the upper end of the frame and upon the same side with the outlet-opening, and a trap having an inlet-opening corresponding to the outlet-opening, and also having a detachable connection with the fastening means.

In testimony that I claim the foregoing as my own I have hereto affixed my signature in the presence of two witnesses.

VERNER HENRY CRANKSHAW.

Witnesses:
 FRED. S. WHEAT,
 GEO. H. MOORE.